United States Patent Office 3,822,289
Patented July 2, 1974

3,822,289
SYNTHESIS OF THIOPHENS
Nicholas R. Clark, Cannock, and William E. Webster, Knosall, near Stafford, England, assignors to Synthetic Chemicals Limited, Marley, England
No Drawing. Filed May 15, 1972, Ser. No. 253,066
Claims priority, application Great Britain, May 5, 1972, 17,574/72
Int. Cl. C07d 63/00
U.S. Cl. 260—332.8                     13 Claims

ABSTRACT OF THE DISCLOSURE

Thiophens are made by reacting organic compounds having a consecutive chain of at least four carbon atoms with carbon disulphide or carbonyl sulphide in a vapour phase reaction in the presence of a catalyst.

---

Various methods of making thiophen and its homologues are known. For example butane and various substituted $C_4$-hydrocarbons, which may or may not be saturated, may be reacted with sulphur to form various thiophens (Chemical Industries 1947, 60, 593). A mixture of thiophen and alkyl thiophens is obtained by heating acetylene and a sulphur source, which is usually sulphur, hydrogen sulphide or ferrous sulphide (e.g. J.C.S. 1924, 125, 2264 and J.C.S. 1928, 2068). Attempts have also been made to use carbon disulphide as the sulphur source (J.C.S. 1928, 2857) but it was found that extremely poor results are obtained. Thus at 350° C. only a trace of thiophen is obtained and at 700° C. only 10% thiophen is obtained.

Another method of making thiophens involves cyclisation of 1,4-dicarbonyl compounds, 1,4-diacids or 4-ketoacids by heating with phosphorus sulphides in the liquid phase (e.g. Berichte, 18, 1601 (1885)). Another method involves cyclisation of alcohols having a straight chain of at least 4 carbon atoms by reaction with sulphur dioxide over chromia alumina catalyst. However this method also gives very poor yields. For example the use of butanol only gives 10% thiophen and isoamyl alcohol only gives 12.4% of 3-methyl thiophen. Other alcohols tend to give lower yields still. If butene, obtained by the dehydration of butanol, is reacted with sulphur dioxide over chroma alumina catalyst the yield of thiophen can be increased up to 33% (Zhur Obshchei Khim, 1953, 23, 1725–1730). Yields of 3-ethyl thiophen of up to about 38% have been described in Russian Patent No. 178,809 as being obtained by passing 2-ethyl butanol-1-ol with hydrogen sulphide at a temperature of 400 to 500° C. in the presence of an alumina chromia catalyst promoted with potassium oxide. Ethylene glycol with hydrogen sulphide over alumina only gives a small yield (1.3%) of thiophen (Dokl. Akad. Nauk. S.S.S.R. 1949, 68, 541–544).

Despite the fact that there has been so much work conducted over a large number of years on the formation of thiophens by cyclising reactions in the presence of various sulphur compounds, and despite the very poor yield obtained when acetylene is reacted with carbon disulphide, we have now found surprisingly that carbon disulphide will react with a wide variety of starting materials in the vapour phase at elevated temperature in the presence of a catalyst to form a thiophen in a yield which often exceeds that obtained with any other source. Similarly, carbonyl sulphide can be used in place of some or all of the carbon disulphide. It may be that in some at least of our processes carbonyl sulphide is formed as an intermediate even when carbon disulphide is used initially.

The starting materials that may be used in the invention are organic compounds containing a consecutive chain of at least four carbon atoms linked by single or double bonds. Any of the carbon atoms of the chain may be substituted by hydrogen or they may be individually substituted by a functional group such as hydroxyl, oxygen, alkyl, aralkyl, or aryl. Optionally two adjacent carbon atoms may form part of an aromatic or heterocyclic ring system. Examples therefore include alkanes, olefines, ketones, aldehydes, alcohols and the alkanes for example may be substituted by, for example, aryl.

The reaction involves cyclisation. It is very surprising that carbon disulphide can be used to produce moderate or good yields in these processes from such a wide variety of starting materials in view of the fact that the only previous experience of its use in the production of thiophens (by reaction with acetylene) showed that it was not satisfactory and was inferior to other sulphur sources, such as hydrogen sulphide, and in view of the fact that many of the known processes described above only give yields that are even reasonable for a very limited range of starting materials.

It is necessary that the reaction be conducted in the presence of a catalyst and the choice of the catalyst has an effect upon the yield of the process. A wide variety of catalysts can be used. Most of the satisfactory catalysts can be considered to be dehydration, dehydrogenation or oxidation catalysts, or catalysts that comprise a mixture of components having either two or all three of these properties. Particularly satisfactory catalysts comprise catalysts containing an oxide of a metal of group VIa often in admixture with an oxide of a metal of group IIIa. Throughout this specification all references to groups are to the groups in the Mendeleeff Periodic Table as published in "General and Inorganic Chemistry" by Partington, 3rd edition published by Macmillan. Preferred metals of group VIa are chromium and molybdenum while the preferred metal of group IIIa is aluminium. Other suitable catalysts include oxides of groups VII or VIII (for example manganese oxide), often in admixture with alumina or silica, while still other suitable catalysts include oxides of groups IVa, especially thoria. Another suitable catalyst comprises an oxide of group Va, especially vanadium pentoxide.

It is often desirable to include in the catalyst some alkali or alkaline earth metal, which is generally added to the catalyst after the formation of the catalyst has otherwise been completed. Preferred alkalis are potassium and sodium. Examples of alkaline earth metals are calcium and barium. As an example of the effect of alkali addition mention may be made of the use of platinum as the catalyst. Although platinum by itself does, with some starting materials at any rate, give a yield that is not very satisfactory a platinum catalyst to which potassium has been added gives a much improved yield.

The addition of potassium or other alkali or alkaline earth metal can be made to a preformed catalyst by adding potassium carbonate or some other alkali compound. The amount of alkali or alkaline earth metal compound present on the catalyst can be, for example, from 4 to 20% by weight, calculated as potassium carbonate. For example 6% potassium carbonate can be added to a preformed chromia alumina catalyst.

Particularly preferred catalysts are the catalysts of chromia on alumina, for example 11% chromia with all or most of the remainder of the catalyst being alumina, of manganese oxide or of molybdenum oxide, all of these preferably being promoted with potassium or sodium.

The choice of starting material controls the thiophen that is obtained. Thus a starting material containing solely four carbon atoms in a straight chain will produce thiophen while a starting material containing more than four carbon atoms will produce a substituted thiophen.

The starting compound may be an alcohol, and the alcohol can be a dihydric alcohol or it can be unsaturated. It may be substituted by one or more substituents individually selected from hydrogen, alkyl, aryl, aralkyl or heterocyclic. A suitable heterocyclic substituent is pyridyl. A typical unsaturated starting alcohol is but-2-enyl alcohol and a typical dihydric alcohol is 1,4-glycol. The preferred alcohols are those in which each group R is individually selected from hydrogen or alkyl, especially those compounds in which not more than one or at the most two of the groups R are alkyl.

Suitable olefins may have more than one unsaturated position and may be substituted as indicated for alcohols. Suitable olefins include butenes, butadiene and isoprene.

A variety of ketones or aldehydes can be used as starting material. Broadly any ketone or aldehyde having a carbon skeleton substituted as defined above for alcohols could be used. Examples are butyraldehyde and methyl isobutyl ketone. Similarly, a wide variety of alkanes can be used, and again any alkane having a carbon skeleton of four consecutive carbon atoms, but which can also be substituted, can be used.

Particularly useful starting materials include those comprising a benzene ring substituted by a straight chain of two or more carbon atoms since these can result in the formation of benzothiophens. For example reaction of ethyl benzene in the process of the invention results in the formation of benzo-(b)-thiophen. On the other hand sec-butyl benzene will result in the formation of 3-phenyl thiophen.

Other particularly useful starting materials are alcohols, for example n-butanol which yields thiophen, a pentanol, which will yield a methyl thiophen, normal hexyl alcohol which yields 2-ethyl thiophen and normal heptyl alcohol yields 2-propyl thiophen. If the starting alcohol is substituted at the 2- and/or 3-positions the thiophen will be substituted in the 3- and/or 4-positions. For example 2-ethyl butan-1-ol yields 3-ethyl thiophen.

The temperature of the reaction is preferably between 350 and 650° C. We find that at temperatures below 450° C. conversion of the starting compoud and yield of desired thiophen drops sharply and there does not seem to be any particular merit in operating above 550° C.

Provided there is sufficient carbon disulphide or carbonyl sulphide present it is easily possible to achieve substantially complete conversion of the starting compound, for example 99% or more. This is especially desirable when the starting material is an alcohol since thiophen and its homologues tend to form azeotropes with the alcohols that may be used with the result that separation of the thiophen from admixture with the alcohol could be difficult.

When an alcohol is starting material we prefer the mole ratio of carbon disulphide to alcohol to be from 4:1 to 0.1:1 and it is often preferably from 2:1 to 1:1. Thus usually an excess over the equimolar amount of carbon disulphide is used. Similar ratios are suitable when other starting materials are used.

The contact time with the catalyst is usually between 0.1 to 20 seconds. Preferably it is 4 to 8 seconds with the best results often being achieved at about 5 seconds. Higher values tend to reduce the yield of thiophen, while maintaining high conversion, while lower values tend to reduce both the conversion and the amount of product obtained. We define contact time as:

$$\text{Contact time (secs.)} = \frac{V \times 3600 \times 273}{22400 \times N \times T}$$

where

V = volume reaction zone in ml.
N = total g. moles/hour fed to reactor
T = temperature in ° K.

The reaction is normally conducted at atmospheric pressure but higher or lower pressures may be used.

While carrying out the process of the invention it may be found, with some catalysts at least, that the yield increases at the beginning of the reaction and then after several hours operation gradually falls again. If it is observed that the yield of a reaction decreases after a few hours it is advisable to discontinue the reaction and to regenerate the catalyst.

The yield obtained in any particular process depends upon the starting materials and upon the reaction conditions, including the choice of catalyst. However, as explained, it is possible to obtain high yields in processes according to the invention. As an example, when 3-methyl butanol is reacted with carbon disulphide in the presence of a chromia alumina catalyst it is possible to obtain an average yield of at least 70% during the first 10 to 12 hours of the reaction. It is found that generally the yield gradually falls during the next 12 hours after which a reduction in conversion makes it advisable to regenerate the catalyst. In practice it is preferable to regenerate after between about 12 and 24 hours operation and this is done by burning off carbon with a steam/air mixture under controlled conditions.

The thiophen obtained from an alcohol is usually contaminated with thiols and a convenient way of separating the product is to condense the gaseous reaction product and wash it with an alkaline solution of cresylic acid.

The following are Examples of the invention.

EXAMPLE 1

A mixture containing 33 parts 3-methyl butan-1-ol and 34.6 parts carbon disulphide by volume was pumped at a rate of 67.5 ml. per hour into a 1″ diameter stainless steel tubular reactor containing 100 ml. Girdler G41 catalyst (a chromia alumina catalyst containing about 11% chromia) promoted with 6% potassium carbonate, and 30 ml. silicon carbide to act as a pre-heater. The preheating and reaction zones were maintained at 500° C. by a salt bath. The reaction product was condensed, washed twice with equal volumes of 20% sodium hydroxide containing 13 gms. cresylic per 100 ml. solution, to remove thiols to give a 70% yield (referred to the 3-methyl butan-1-ol) of 3-methyl thiophen. The conversion of 3-methyl butan-1-ol was 99.5% and the duration of the run was 11 hours.

EXAMPLE 2

A mixture containing equal parts by volume of n-butanol and carbon disulphide was fed at a rate of 76 mls./hour into a reactor as described in Example 1 containing 100 ml. of the catalyst. The preheating and reaction zones were maintained at 500° C. by means of a salt bath. The reaction product was condensed, washed twice with equal volumes of 20% sodium hydroxide solution containing 13 gm. cresylic acid per 100 ml. to remove thiols, to give a 67.5% molar yield of thiophen referred to n-butanol. The conversion of n-butanol was 97.5% and the duration of the run was 11 hours 30 minutes.

EXAMPLE 3

A mixture containing 33 parts pentan-1-ol and 34.6 parts carbon disulphide by volume was pumped at a rate of 67.5 ml. per hour into a reactor as described in Example 1. The preheating and reaction zones were maintained at 500° C. by means of a salt bath. The product was condensed and washed as before to remove thiols, giving a 51% molar yield of 2-methyl thiophen referred to pentan-1-ol. The conversion of pentan-1-ol was 98% and the duration of the run was 24 hours.

EXAMPLE 4

A mixture containing 27.5 ml. carbon disulphide and 32.5 ml. 2-methyl butene-1 was pumped at 65 ml. per hour into an electrically heated reactor comprising a 1″ diameter stainless steel tube containing 100 ml. catalyst as described in Example 1. The average temperature of the reaction zone was 460° C. A molar yield of 29.7%

3-methyl thiophen referred to the 2-methyl butene-1 at 100% conversion was obtained. The total duration of the run was 90 minutes.

EXAMPLE 5

Carbon disulphide at a rate of 17 ml./hour and 1,4-butane diol at a rate of 18.5 ml. per hour were pumped into a reactor as described in Example 1 at a temperature of 400° C. for a total reaction time of 4 hours. The crude product was worked up to give a 30% molar yield of tetrahydrothiophen and a 13% molar yield of thiophen.

EXAMPLE 6

A mixture containing 43.5 parts by weight carbon disulphide and 26.7 parts by weight pentan-2-ol was pumped at a rate of 66.5 gm. per hour into a reactor as described in Example 1 at 500° C. for a total reaction time of 3 hours 45 minutes. A 41% molar yield of 2-methyl thiophen was obtained.

TABLE 1

| Catalyst number: | Description |
| --- | --- |
| 2 | Thoria ex Thorium Ltd. |
| 3 | Ceria on alumina. |
| 4 | Iron oxide on alumina, grade 123M ex Girdler. |
| 5 | Nickel on silica (Nicat) ex Crosfields Ltd. |
| 6 | Chromia on alumina, grade G41 ex Girdler, promoted 4% $Na_2CO_3$. |
| 7 | Platinum on lumina catalyst RD 150 ex Engelhard. |
| 8 | Catalyst No. 7 promoted with 5% $K_2CO_3$. |
| 9 | Catalyst No. 4 promoted with 4% $K_2CO_3$. |
| 10 | Catalyst No. 5 promoted with 4% $K_2CO_3$. |
| 11 | Vanadium pentoxide catalyst grade G101 ex Girdler, promoted with 9% $K_2CO_3$. |
| 12 | Molybdenum oxide catalyst grade T306 ex Gridler, promoted with 5% $K_2CO_3$. |
| 13 | 33% Chromia on alumina catalyst CrO304 ex Harshaw, promoted with 4% $K_2CO_3$. |
| 14 | Tungsten oxide catalyst W.08 01 ex Harshaw. |
| 15 | Catalyst No. 14 promoted with 4% $K_2CO_3$. |
| 16 | Tin phosphate on alumina. |
| 17 | Manganese oxide on alumina Mn 0201 T Harshaw promoted with 4.5% $K_2CO_3$. |

TABLE 2

| Catalyst | 2 | 3 | 4 | 5 | 6 | 7 | 8 | 9 | 10 | 11 | 12 | 13 | 14 | 15 | 16 | 17 |
| --- | --- | --- | --- | --- | --- | --- | --- | --- | --- | --- | --- | --- | --- | --- | --- | --- |
| Ml. per hour | 61 | 75 | 68 | 61 | 62 | 63 | 60 | 62 | 61 | 71 | 57 | 57 | 61 | 60 | 57 | 38 |
| Reaction time (hrs.) | 3 | 3 | 3 | 3 | 3 | 3 | 3 | 3 | 3 | 4 | 5 | 5 | 3 | 1.5 | 3 | 3 |
| Percent yield 3-MT | 37 | 16.5 | 11 | 35 | 55 | 5 | 23 | 31 | 30 | 26 | 49 | 54 | 6 | 24 | 21 | 51 |
| Conversion | 99 | 98 | 98 | 98 | 99 | 98 | 99 | 99 | 86 | 48 | 99 | 99 | 99 | 99.5 | 99.5 | 100 |

EXAMPLE 7

A mixture containing 27.4 parts by volume carbon disulphide and 37 parts by volume 2-ethyl butan-1-ol was pumped into a reactor as described in Example 1 at a rate of 63 ml./hour at 500° C. A 50% molar yield of 3-ethyl thiophen was obtained as indicated by G.L.C. analysis.

EXAMPLE 8

A mixture containing 27.5 parts by volume carbon disulphide and 37.2 parts by volume hexan-1-ol was pumped into the reactor at a rate of 62 ml. per hour during 5 hours. On working up a $C_2$-alkyl thiophens fraction boiling at 138–144° C. was obtained. Based on N.M.R. analysis, the fraction containing a 6% molar yield of 2:5-dimethyl thiophen and a 25% molar yield of 2-ethyl thiophen.

EXAMPLE 9

A mixture containing 27.5 parts carbon disulphide and 42.4 parts heptan-1-ol by volume was fed to the reactor at 51 ml./hour, the reaction zone being held at 500° C. On working up, a $C_3$-alkyl thiophens fraction was obtained boiling at 155.5–161.6° C. and containing a 4% molar yield of 2-methyl-5-ethyl thiophen and 17% molar yield of 2-n-propyl thiophen, based on analysis by N.M.R.

EXAMPLE 10

A mixture containing 27.4 parts carbon disulphide and 48 parts octan-1-ol by volume was fed to the reactor at 500° C. at 59 ml. per hour during 5 hours. The resulting $C_4$-alkyl thiophens fraction boiled at 180–185° C. and contained a 9% molar yield of 2-n-butyl thiophen and 3% molar yield of mainly 2-methyl-5-propyl thiophen, based on N.M.R. analysis.

EXAMPLE 11

A mixture containing 274 parts by volume of carbon disulphide and 330 parts by volume of 3-methyl butan-1-ol was pumped at a rate of 63 ml. per hour into a stainless steel reaction tube, heated electrically, and comprising 50 mls. silicon carbide as a preheater section and 100 mls. uranium oxide on magnesia as catalyst in the reaction zone. The total reaction time was 3 hours. A 35% molar yield of 3-methyl thiophen was obtained at 99% conversion of 3-methyl butanol.

The process of this Example was repeated using sixteen different catalysts as defined in Table 1 below. The results obtained are given in Table 2 below. In this Table the yield is the yield of 3-methyl thiophen.

EXAMPLE 12

A mixture containing 305 parts isoprene and 274 parts carbon disulphide by volume was pumped at a rate of 57 mls. per hour into a reactor as described in Example 4 held at an average temperature of 500° C. A 14% yield of 3-methyl thiophen was obtained at 100% conversion of isoprene during a 90 minute reaction period.

EXAMPLE 13

A mixture containing 472 parts sec. butyl benzene and 274 parts carbon disulphide by volume was pumped during 4 hours into a reactor as described in Example 4. The average temperature was 500° C. Based on G.L.C. and infra-red analysis, a 22% yield of 3-phenyl thiophen was obtained at 49% conversion.

EXAMPLE 14

A mixture of 380 parts methyl isobutyl ketone (4-methyl pentan-2-one) and 274 parts carbon disulphide by volume was pumped into the reactor as described in Example 4 at a rate of 61 ml. per hour. The average temperature was 500° C. By G.L.C. and infra-red analysis, a 31% molar yield of 2,4-dimethyl thiophen was obtained at 100% conversion of the ketone.

EXAMPLE 15

Isoprene and carbonyl sulphide were passed into a reactor as described in Example 4 at rates 31.3 ml./hour and 185 ml./min. respectively. The average temperature was maintained at 500° C. Based on G.L.C. analysis, a 15% molar yield of 3-methyl thiophen, referred to isoprene consumed was obtained.

EXAMPLE 16

A mixture containing 350 parts n-pentane and 274 parts carbon disulphide by volume were passed into a reactor as described in Example 4. The average temperature was 500° C. An 8.5% molar yield of 2-methyl thiophen was obtained, based on G.L.C. analysis.

EXAMPLE 17

1.08 kg./hour 3-methyl butanol and 1.41 kg./hour carbon disulphide were evaporated, preheated to 400° C. and passed into a fluid bed reactor 2'6" x 8" diameter, containing 2.8 kg. Girdler G41 catalyst promoted with 6% potassium carbonate and of 100–150 mesh particle size. The temperature within the catalyst bed was 500° C. Over a 20 hour period, a 47.4% yield of 3-methyl thiophen was obtained at 99% conversion.

EXAMPLE 18

A mixture containing 250 parts crotonaldehyde and 274 parts carbon disulphide by volume was pumped at a rate of 55 mls. per hour into the reactor described in Example 4, held at an average temperature of 500° C. A 61% yield of thiophen was obtained at 100% conversion, during a 2 hour reaction period.

EXAMPLE 19

A mixture containing 370 parts ethyl benzene and 274 parts carbon disulphide by volume was pumped at a rate of 62.5 ml. per hour into the reactor described in Example 4 held at an average temperature of 500° C. A 12% yield of benzo-[b]-thiophen was obtained at 55% conversion during a 2 hour reaction period.

We claim:

1. A method of making a thiophen comprising reacting an organic compound containing a consecutive chain of at least four carbon atoms linked by single or double bonds and in which each carbon atom in the chain of 4 may be substituted by a substituent selected from hydroxyl, oxo, alkyl, aralkyl or aryl and wherein two adjacent carbon atoms in the chain of four may be part of an aromatic or heterocyclic ring system, with carbon disulphide in the vapour phase at a temperature of 350° to 650° C. and in the presence of a catalyst consisting essentially of a member selected from the group consisting of an oxide of a metal of Groups IVa, Va, VIa, VII and VIII; an admixture of an oxide of a metal of Group VIa with an oxide of a metal of Group IIIa; an admixture of an oxide of a metal of Group VII or VIII with alumina or silica; platinum; platinum, ceria or tin phosphate on alumina; nickel on silica; and uranium oxide on magnesium oxide; and optionally admixed with an alkali or alkaline earth metal.

2. A method according to claim 1 in which the reaction is conducted at a temperature of from 450 to 550° C.

3. A method according to claim 1 in which the contact time is between 0.1 and 20 seconds.

4. A method according to claim 1 in which the contact time is from 4 to 8 seconds.

5. A method according to claim 1 in which the catalyst is promoted by alkali or alkaline earth metal.

6. A method according to claim 1 in which the catalyst is a chromia alumina catalyst promoted by alkali or alkaline earth metal.

7. A method according to claim 1 in which the catalyst is a molybdenum oxide catalyst promoted by alkali or alkaline earth metal.

8. A method according to claim 1 in which the catalyst is a manganese oxide catalyst promoted by alkali or alkaline earth metal.

9. A method according to claim 1 in which carbon disulphide is used and the molar ratio of carbon disulphide to the said organic compound is from 4:1 to 0.1:1.

10. A method according to claim 1 in which carbon disulphide is used and the molar ratio of carbon disulphide to the said organic compound is from 2:1 to 1:1.

11. A method according to claim 1 in which an alcohol or olefin is reacted with carbon disulphide.

12. A method according to claim 1 in which butanol is reacted to form thiophen.

13. A method according to claim 1 in which 3-methyl butanol is reacted to form 3-methyl thiophen.

References Cited

UNITED STATES PATENTS

| 3,347,867 | 10/1967 | Osborn | 260—327 |

FOREIGN PATENTS

| 489/64 | 1/1964 | Japan | 260—332.8 |
| 1,268,151 | 5/1968 | Germany | 260—332.8 |
| 535,318 | 1/1957 | Canada | 260—332.8 |

OTHER REFERENCES

Sidhu et al.: *J.A.C.S.* 88:2 (Jan. 20, 1966), pp. 254–263.

HENRY R. JILES, Primary Examiner

C. M. S. JAISLE, Assistant Examiner

U.S. Cl. X.R.

260—294.8 D